Mar. 13, 1923.

W. W. BRILHART

OPTICAL LENS

Filed Jan. 28, 1921

1,448,052

Witnesses:
Wm L Beck
S H Brady

William W Brilhart INVENTOR

BY

ATTORNEYS

UNITED STATES PATENT OFFICE.

WILLIAM W. BRILHART, OF INDIANA, PENNSYLVANIA.

OPTICAL LENS.

Application filed January 28, 1921. Serial No. 440,638.

*To all whom it may concern:*

Be it known that I, WILLIAM W. BRILHART, a citizen of the United States, residing in the town and county of Indiana and State of Pennsylvania, have invented certain new and useful Improvements in Optical Lenses, of which the following is a specification.

My invention relates to the manufacture of invisible solid ground bifocal and multifocal lenses, which are employed in spectacles, eye-glasses or other optical instruments of that class.

My invisible solid ground bifocal and multifocal lenses differ from other forms of solid ground bifocal and multifocal lenses, in that, the various combination curves of the respective bifocal and multifocal faces thereof, are united with an absence of the ridges that usually mark the union of such different powered curves.

An invisible solid ground bifocal lens may be constructed in accordance to my invention by grinding and polishing upon one main surface of a slab of glass a cylindrical curve, or a spherical curve, centrally located, and a bifocal curve, composed of two different powered curves, which are centered, preferably, in line with or at right angles to the axis of this cylindrical curve, or in line with the center of this spherical curve, respectively, and by finally grinding and polishing the remaining opposite main surface of this slab of glass to any required curved surface, as is usual in the manufacture of optical lenses.

An invisible solid ground multifocal lens may be constructed in accordance with my invention by grinding and polishing upon one main surface of a slab of glass a cylindrical curve, or a spherical curve centrally located, and a multifocal curve, composed of three or four different powered curves, which are centered, preferably in line with or at right angles to the axis of this cylindrical curve or, respectively, with the center of this spherical curve, and by finally grinding and polishing the remaining opposite main surface of this slab of glass to any required curved surface in the usual manner as is employed in the manufacture of optical lenses.

Differing from other known invisible solid ground bifocal and multifocal lenses, my lenses do not distort objects, since I employ regularly centered curves in the respective bifocal and multifocal faces thereof, in contrast to irregularly centered curves, as is employed in other forms of this kind of lenses.

It will be understood that these lenses, as described herein may be pressed, moulded, ground and polished in any required manner and to any necessary combination of curved surfaces or forms, such as convex or concave, flat or toric.

Referring to the drawings:—

Figure 1:
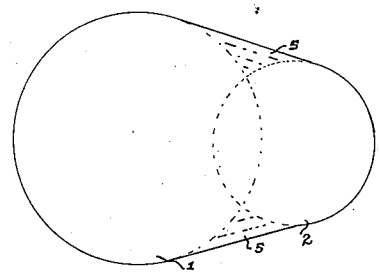
Figure 1, represents a plan view of two different powered curves which are united with an absence of the ridge that usually marks such an union, which is effected by the introduction of the cylindrical curve as shown therebetween.
Figure 2:
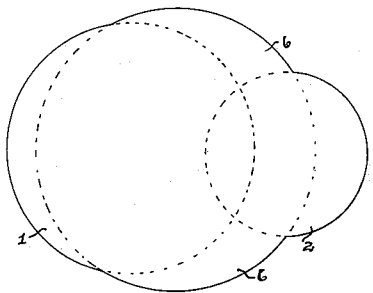
Figure 2, represents a plan view of two different powered curves which are united together with an absence of the union ridge by the introduction of a spherical curve which is centrally located as shown.
Figure 3:
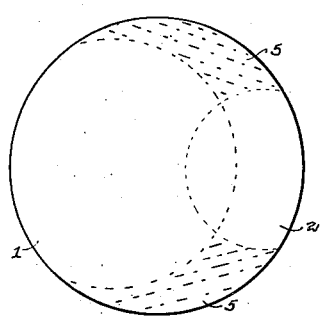
Figure 3, represents a face view of an invisible solid ground bifocal optical lens of which the union ridge of the two combination curves of the bifocal face thereof is eliminated by the introduction of a cylindrical curve therebetween.
Figure 4:
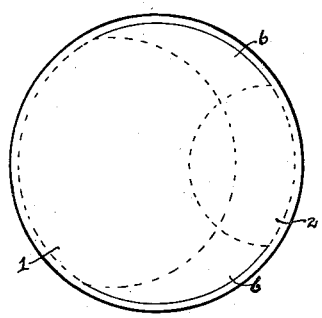
Figure 4, represents a face view of an invisible solid ground bifocal lens of which the union ridge of the two combination curves of the bifocal face thereof is eliminated by introducing a spherical curve therebetween, as shown.
Figure 5:
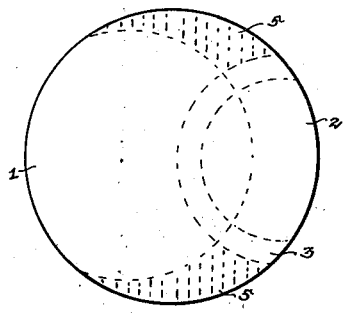
Figure 5, represents a face view of an invisible solid ground multifocal optical lens of which the union ridges of the three combination curves of the multifocal face thereof are eliminated by introducing a cylindrical curve between the distance and the two remaining combinating curves of this multifocal face.
Figure 6:
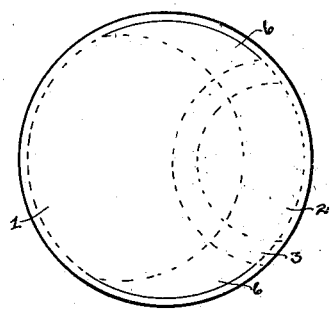
Figure 6, represents a face view of an invisible solid ground multifocal optical lens of which the union ridges are eliminated by the introduction of the spherical curve between the distance and the two remaining combinating curves of this multifocal face.

In the several figures of the drawings, 1, represents the distant correcting curve; 2, the reading correcting curve; 3, the first intermediate correcting curve; 5, the cylindrical union curve; and 6, the spherical union curve, as shown.

Having described my invention, I claim the following:

1. An invisible solid ground optical lens having near and distance visual fields arranged the one above the other and intermediate curved regions at opposite edge portions and partly between the near and the distance visual fields.

2. An invisible solid ground optical lens having near and distance visual fields arranged the one above the other and an intermediate curved region at opposite edge portions and extending between the near and the distance visual fields.

3. An invisible solid ground bifocal optical lens having near and distance visual fields arranged the one above the other and intermediate curved regions at opposite edge portions and partly between the near and the distance visual fields.

4. An invisible solid ground bifocal optical lens having near and distance visual fields arranged the one above the other and an intermediate curved region at opposite edge portions and extending between the near and the distance visual fields.

5. An invisible solid ground multifocal optical lens having near, intermediate and distance visual fields arranged the one above the other and intermediate curved regions at opposite edge portions and partly between the distance and the intermediate visual fields.

6. An invisible solid ground multifocal optical lens having near, intermediate and distance visual fields arranged the one above the other and an intermediate curved region at opposite edge portions and extending between the distance and the intermediate visual fields.

I have hereto signed my name this 26th day of January, A. D. 1921.

WILLIAM W. BRILHART.

Witnesses:
Wm. L. Beck,
S. H. Brady.